US008342294B2

(12) United States Patent
Madoz Michaus et al.

(10) Patent No.: US 8,342,294 B2
(45) Date of Patent: Jan. 1, 2013

(54) OVERSPEED DETECTION MECHANISM IN LIFT APPARATUSES, SAFETY DEVICE ACTING AGAINST OVERSPEED AND LIFT APPARATUS

(75) Inventors: Miguel Angel Madoz Michaus, Hernani (ES); Anartz Alonso Maritxalar, Hernani (ES); Felix Martinez Noguera, Arrasate-Mondragon (ES)

(73) Assignee: Orona, S. Coop., Guipuzcoa (ES)

( * ) Notice: Subject to any disclaimer, the term of this patent is extended or adjusted under 35 U.S.C. 154(b) by 1119 days.

(21) Appl. No.: 11/994,963

(22) PCT Filed: Jan. 10, 2006

(86) PCT No.: PCT/ES2006/000006

§ 371 (c)(1),
(2), (4) Date: Jun. 18, 2008

(87) PCT Pub. No.: WO2007/006818

PCT Pub. Date: Jan. 18, 2007

(65) Prior Publication Data

US 2008/0245617 A1 Oct. 9, 2008

(30) Foreign Application Priority Data

Jul. 8, 2005 (ES) .................................. 200501675

(51) Int. Cl.
*B66B 5/04* (2006.01)
*B66B 5/20* (2006.01)
*F16D 59/00* (2006.01)
*F16D 63/00* (2006.01)
*F16D 65/14* (2006.01)

(52) U.S. Cl. ........ 187/373; 187/359; 187/375; 188/180; 188/185; 188/189

(58) Field of Classification Search .................. 187/350, 187/356, 368–369, 373, 351, 359; 188/41, 188/185, 180, 189; 192/14, 140, 105 CE, 192/105 CD, 103 R, 105 CP; 242/289, 292, 242/301; 74/336.5, 336 R; 254/370; 182/234; *B66B 5/04, 5/24, 5/18, 5/20*
See application file for complete search history.

(56) References Cited

U.S. PATENT DOCUMENTS

| | | | | |
|---|---|---|---|---|
| 2,647,603 | A * | 8/1953 | Smith | 192/105 CE |
| 3,415,343 | A * | 12/1968 | Svensson | 187/270 |
| 3,528,624 | A * | 9/1970 | Tamarin | 242/385.1 |
| 4,856,623 | A * | 8/1989 | Romig, Jr. | 188/180 |
| 5,222,578 | A * | 6/1993 | Thorp | 187/305 |
| 6,176,350 | B1 * | 1/2001 | Schlosser | 187/368 |
| 2003/0042079 | A1 * | 3/2003 | Sanchez et al. | 187/373 |
| 2004/0262109 | A1 * | 12/2004 | Timtner | 188/377 |

* cited by examiner

*Primary Examiner* — Michael Mansen
*Assistant Examiner* — Stefan Kruer
(74) *Attorney, Agent, or Firm* — Ostrolenk Faber LLP

(57) ABSTRACT

The invention relates to an overspeed detection mechanism in lift apparatuses, safety device acting against overspeed and a lift apparatus, which detection mechanism can be assembled on a sheave or on the elevator car. It incorporates a wheel rotating according to the speed of the car and has pivoting arms swinging through the centrifugal force during the rotation of the wheel. It has magnetic means associated to the pivoting arms causing an attraction maintaining the position of the pivoting arms until the centrifugal force exceeds the attraction of the magnetic means. It incorporates a stop, belonging to a part external to the wheel against which the pivoting arm comes into contact when the centrifugal force generated on the pivoting arm due to the overspeed of the elevator car exceeds the attractive force of the magnetic means, starting the braking of the car.

7 Claims, 9 Drawing Sheets

A-A

C-C

OVERSPEED DETECTION MECHANISM IN LIFT APPARATUSES, SAFETY DEVICE ACTING AGAINST OVERSPEED AND LIFT APPARATUS

CROSS REFERENCE TO RELATED APPLICATION

The present application is a 35 U.S.C. §§371 national phase conversion of PCT/ES2006/000006, filed Jan. 10, 2006, which claims priority of Spanish Patent Application No. P 200501675, filed Jul. 8, 2005, the disclosure of which has been incorporated herein by reference. The PCT International Application was published in the Spanish language.

OBJECT OF THE INVENTION

The present invention is comprised in the field of lift apparatuses, specifically in safety systems for detecting and acting in the event that the speed limit of the elevator car provided under the laws in force is exceeded.

An object of the invention is an overspeed detection mechanism and a safety device acting on the elevator, stopping it in the event of detecting the overspeed situation, which safety device can incorporate said overspeed detection mechanism or the like.

The invention proposes an optimization of the functional conditions of said safety device and mechanism, a space reduction, simplicity of the components, easy assembly and elimination of maintenance operations.

The invention also relates to the lift apparatus incorporating the mentioned overspeed detection mechanism and the safety device acting against overspeed.

BACKGROUND OF THE INVENTION

The regulation in force relating to lift apparatuses (Directive 95/16/EC) provides that all lift apparatuses have overspeed safety systems for the purpose of assuring people's safety. These protective means must act in the moment in which the apparatus reaches a speed exceeding the nominal speed by a magnitude provided under the regulation for the car traveling both in the upward and downward direction, completely stopping the car.

As a result of this regulation, lifts conventionally have a speed governor usually located in the machine room, or recently in the upper part of the elevator shaft in the event of not having a machine room. Said speed governor comprises a sheave sharing the same axis of rotation and through which a segment of rope passes, the ends of which rope are joined to the car, such that the rope is tensed by a second sheave arranged in the pit of the elevator shaft. In the moment in which the car exceeds the established speed limit, the speed governor acts on the safety gear located in the car frame, such that the safety gear stops the car by friction.

The latest technological advances in the field of the speed governors have focused on reducing the necessary space occupied by these devices with the objective of optimizing the efficiency of the shaft, simplifying the assembly and facilitating maintenance. This translates into recent new inventions in which the governor rope as well as the corresponding tension sheave are eliminated, such that the speed governor is a rider associated to the car and acts on the safety gear by means of different intermediate mechanisms.

The known state of the art includes patent ES 2184612 describing a centrifugal speed governor rider on the car acting on the safety gear by means of a set of levers forming a four bar linkage. The overspeed detection device obtains the rotating speed through contact of a disc with the guide rail on which the car travels. In the moment of activation, the speed governor locks up and by means of the force of friction generated between the disc and the guide rail, movement of the four-bar linkage which in turn acts on the safety gear begins.

Patent EP 0475114 describes a safety device rider on the car combining a centrifugal force speed governor with the safety gear by means of a conventional set of levers. Like the previous invention, the activation force of the safety gear is established by the friction between the rotating element associated to the governor and the guide rail.

U.S. Pat. Nos. 4,662,481, 5,377,786 and WO 03070615 describe inventions which, like the previous documents, combine a centrifugal force speed governor associated to the car with the safety gear by means of different intermediate mechanisms, usually sets of conventional levers, obtaining the car traveling speed through contact with the guide rail on which it travels, such that the activation force of the safety gear is established by the friction existing between these two elements.

All these inventions share the need of having an intermediate mechanism between the overspeed detection device (usually called the speed governor) and the safety gear. They also need to have means for assuring suitable friction between the guide rail and the disc belonging to the overspeed detection device, since the activation force of the safety gear is established by said contact. Particular care must be taken with this aspect, since the guide rails are susceptible of being impregnated with different chemical agents, such as lubricants, oils, etc., necessary either to favor the car guiding system or for maintenance of the traction ropes, being able to affect the contact between guide rail and speed governor. Both the intermediate activation mechanism and the means for assuring suitable contact between disc and guide rail limit the space required for the safety system formed by the speed detection device, the actuating device and the safety gear.

In the field of the art comprising the present invention, it is known that any improvement in reducing the necessary space occupied by the safety system, as well as reducing the number of parts forming it, involves a technological advance.

DESCRIPTION OF THE INVENTION

The present invention proposes an overspeed detection mechanism which is designed to detect this overspeed situation of the car or of the counterweight of an elevator both in the upward and downward direction, designed in a preferred application for its linkage to the frame of the elevator car and forming part of a complete safety device which acts by stopping the elevator in the event of detecting that overspeed situation, or in another alternative application it is used as an independent element associated to an upper or lower sheave of the installation of the elevator on which it directly acts, stopping it in the event of overspeed detection, and therefore stopping the car of the lift apparatus.

Another object of the invention is the actual safety device proposing a compact solution, incorporating such device or another overspeed detection mechanism and a braking mechanism acting in a synchronized manner on both sides of the same guide rail.

Another object of the invention relates to the lift apparatus incorporating said safety device associated to a guide rail or which can include in addition to said safety device a braking mechanism associated to another parallel guide rail.

The present invention proposes a customized solution especially focused on up-grades, refurbishments, existing buildings and new constructions in which the dimensions of the shaft are very tight.

In relation to the overspeed detection mechanism, it essentially incorporates a rotating wheel related to the traveling speed of the elevator, in one of the flat faces of which there is assembled at least one pivoting arm, preferably two pivoting arms provided with linked ends and free ends, maintaining its position on the wheel through the attractive force generated by magnetic means associated to said pivoting arms. The pivoting arms swing, connected by synchronization means, preferably gears, directing their free ends towards the perimeter of the wheel under the effect of the centrifugal force generated by the rotation of the wheel. The centrifugal force overcomes the attractive force of the magnetic means when an overspeed situation occurs.

The mechanism also includes a part external to the wheel which is provided with a stop slightly extending towards the inside of the wheel, against which the free end of the pivoting arm comes into contact when the centrifugal force generated on the pivoting arm through the rotation of the wheel due to the overspeed of the elevator car exceeds the attractive force of the magnetic means, starting the braking process to brake the car.

In a possible solution, the overspeed detection mechanism is assembled on the car and associated to a guide rail. In this case the part external to the wheel consists of a drum assembled around the same axis of rotation of the rotating wheel, in a normally fixed position under the effect of corresponding retaining means to which it is associated. The drum is provided with braking elements on its outer face, which can consist of shoes for example, and it consists of the previously described central stop in its inner face, against which one of the free ends of one of the pivoting arms which has swung comes into contact, opening outwardly when the centrifugal force overcomes the attractive force of the magnetic means.

The arm making contact with the stop in the overspeed situation pushes the drum, which will be released from the retaining means and rotate integrally with the wheel until the braking element progressively acts against the guide rail while the drum rotates until only the braking element makes contact with the guide rail, the wheel no longer making contact with the guide rail and the axis of the wheel traveling in the opposite direction to the guide rail.

The movement for opening the pivoting arms is limited by fixed stops located on the face of the wheel on which the pivoting arms are located, against which stops said arms come into contact, establishing their maximum opening position reached under the effect of centrifugal force.

It must be noted that depending on the rotating direction of the wheel, one or the other arm will come into contact with the stop, therefore dragging the drum in one or the other direction. The drum has braking elements acting for the two rotating directions.

In addition the free ends of the pivoting arms are linked with regard to the rest of the pivoting arm. In a normal speed situation of the wheel, the ends of the pivoting arms are in an extended arrangement. When the overspeed situation for a rotating direction occurs, the pivoting arms link, opening up until one of the free ends of one of the arms acts against the stop of the drum, then the other free end of the other pivoting arm rotates inwardly, being retracted and exerting a pushing action against elastic means with which it is in contact, which are flexed so as to later facilitate the recovery of the extended position of said free end with the rest of the pivoting arm.

The linked nature of the free ends allows that on one hand, in their extended position, one of the arms can act against the stop of the drum and that in their retracted position the other arm does not come into contact against the inner face of the drum. In the event that the wheel rotates in the opposite direction, it will be the other arm, previously oriented in the retracted position that remains extended to come into contact against the stop of the drum when the overspeed situation occurs. The overspeed detection mechanism can thus act both for the upward traveling direction and for the downward traveling direction of the car.

The previously mentioned magnetic means can preferably consist of magnets (without discarding the possibility that they can be electromagnets) associated to the pivoting arms and attracted by magnets located in the wheel which are opposite to the arms. In the event of overspeed, the centrifugal force overcomes the attractive force between magnets, then the arms open, being linked towards the outer perimeter of the wheel, as previously described. The distance at which the magnets are located can be modified by regulating means for the purpose of changing the attractive force, the threshold after which the action of the centrifugal force on the pivoting arms overcomes the attractive force between magnets is thus controlled. Another way of regulating the attractive force consists of invalidating one of the magnets.

In another alternative embodiment, the magnetic means can consist of magnets laterally arranged on the pivoting arms, opposite to other magnets integral with the wheel, which can also be provided with distance regulating means.

In any case, these magnetic means provide technical advantages in terms of the activation of the braking elements, which is carried out much more quickly and optimally than in the case of using elastic means.

The possibility that at least one of the magnets is made of a ferromagnetic material is contemplated for the described embodiments.

The overspeed detection mechanism is used in another possible application, for example, for its installation in a lower sheave or in an upper sheave between which the rope of the speed governor travels. In these cases the movement of the wheel is integral with the movement of the sheave. Said sheave will preferably comprise a groove in its perimeter on which the governor rope is supported. For this application the mechanism lacks the described drum and the part called the part external to the wheel consists of a fixed part incorporating the stop against which one of the pivoting arms comes into contact when the overspeed situation occurs, stopping the wheel.

One of the main applications of this overspeed detection mechanism, as previously described, relates to its use as part of the safety device described below.

The proposed safety device incorporates an overspeed detection mechanism and a braking mechanism. A preferred solution contemplates that the safety device is assembled on the frame of the elevator car and consists of a compact assembly formed by the previously described overspeed detection mechanism and a braking mechanism associated to a guide rail on which the car travels. The need to incorporate complex intermediate mechanisms between the detection mechanism and the braking mechanism is prevented by means of this solution, unlike what occurs in other patents.

In this case the wheel of the overspeed detection mechanism is in permanent contact with the guide rail, traveling on such rail in the same upward or downward direction during its rotation. The braking mechanism is directly joined to the overspeed detection mechanism and has braking means traveling in a synchronized manner with the overspeed detection mechanism, coming into contact with the other face of the guide rail when the axis of the wheel of the overspeed detection mechanism travels in the overspeed situation.

In a preferred solution the overspeed detection mechanism and the braking mechanism are assembled respectively on a first and second arm linked at one of their ends with regard to a rack fixed to the frame of the elevator and the opposite ends of which are connected by means of joining means transmitting the swinging movement of the first swinging arm caused by the overspeed detection mechanism to the second swinging arm and therefore to the braking mechanism.

Said joining means between swinging arms can consist of elastic joining means incorporating a spring transmitting the movement between swinging arms.

The braking mechanism incorporates a casing assembled on the second linked arm, provided on its outer face with braking means, which can be shoes or brake pads for example, and an auxiliary wheel in contact with another face of the guide rail. It additionally incorporates a pre-tensioning device adjusting the contact pressure of the wheel on the guide rail.

The overspeed detection mechanism forming part of the safety device acts in the same manner as described above, with its wheel in contact with one of the faces of the guide rail. When the overspeed situation is detected, its arms open until the free end of one of them comes into contact against a stop of the drum, making it rotate integrally with the drum until the braking element comes into contact against the guide rail, generating progressive friction as the drum continues to rotate, making the wheel separate from the guide rail. This traveling of the wheel generates a swinging of the first linked arm on which said wheel is assembled, dragging the second linked arm of the braking mechanism under the effect of the joining means, causing the casing of the braking mechanism to approach the other face of the guide rail, until its braking means act on the guide rail collaborating in braking the assembly.

Unlike other systems, in this case when the braking element of the drum of the overspeed detection mechanism comes into contact with the guide rail, it progressively rotates, being the only surface of contact with the guide rail, establishing the separation of the wheel, and at the same time, the progressive traveling of the braking means of the braking mechanism towards the other face of the guide rail. The drum has a protuberance established in its outer face which comes into contact with a projection associated to the swinging arm on which the overspeed detection device is assembled, stopping the rotation of the drum. This position of the braking means and braking elements of both mechanisms provide friction with the respective faces of the guide rail which establish the stopping of the elevator car.

In other systems, the activation of the so-called safety gear occurs when friction occurs between wheel and guide rail; the activation force of the safety gear depends on the friction force between wheel and guide rail, and means assuring permanent contact between the wheel and the guide rail are necessary to maintain activation of the safety gear, which especially becomes necessary when the guide rail is impregnated with greases and/or lubricants. In the present invention, when the overspeed situation occurs the braking element of the overspeed mechanism is the element in progressive contact with the guide rail, the wheel stops coming into contact with the guide rail, and the braking element, in collaboration with the braking means of the braking mechanism, contribute to completely stopping the elevator car.

The elimination of intermediate activation mechanisms between the detection mechanism and the braking mechanism allows making the safety device more compact, reducing its dimensions as well as the space required for its installation.

A different braking force can be obtained depending on if the device is to act with the elevator traveling up or traveling down. To that end the profile and/or finish of the braking elements of the drum is modified, such that the braking element acting as a consequence of the overspeed in the downward direction has a more pronounced profile than the braking element acting in the lifting direction, in order to thus cause a larger separation of the wheel when said braking element comes into contact with the guide rail, establishing greater traveling of the joining means causing a higher braking force of the braking means against the guide rail.

The braking elements and braking means of each mechanism act progressively on both sides of the guide rail. The disengagement thereof is obtained by the car traveling in the direction opposite to the actuation direction.

As a consequence of incorporating the swinging arms on which the speed detection mechanisms and braking mechanism are assembled, this device provides a substantial improvement in relation to other systems, since this assembly allows compensating for the possible misalignments that may occur on the guide rail, allowing improvements from the comfort and/or acoustic point of view.

In a preferred embodiment of the invention, the safety device incorporates the overspeed detection mechanism, as initially described, provided with magnetic means; however it has also been provided that the safety device can incorporate another overspeed detection mechanism, incorporating the same elements described above, but unlike the foregoing has elastic joining means, such as springs, instead of magnetic means. These elastic means elastically link the pivoting arms to the wheel, maintaining its position for a normal speed of the elevator car.

The elastic means provides a joining force between the pivoting arms that must be overcome by the centrifugal force occurring during the rotation of the wheel in the pivoting arms in order to thus provide the traveling of the pivoting arms until making contact with the stop of the drum, then following the same operative sequence described for the case of the mechanism provided with magnetic means.

In a possible assembly solution, it has been provided that the lift apparatus incorporates a safety device associated to a guide rail, which includes an overspeed detection mechanism and a braking mechanism, and additionally associated to a second guide rail which has a braking mechanism linked to the car frame of the lift apparatus. This braking mechanism will also be connected with the axis of a wheel rotating in contact with said second guide rail, externally to which there is a second drum provided with braking elements on its outer face, which second drum is linked by means of a synchronization bar with the drum of the detection mechanism of the safety device associated to the first guide rail, such that when the activation of the safety device occurs, the synchronized activation of the drum of said braking mechanism on the second guide rail is established.

DESCRIPTION OF THE DRAWINGS

To complete the description that is being made and for the purpose of aiding to better understand the features of the invention according to preferred practical embodiments thereof, a set of drawings is attached as an integral part of said description in which the following is shown in an illustrative and non-limiting manner.

PREFERRED EMBODIMENT OF THE INVENTION

In view of Figures, an embodiment of the overspeed detection mechanism in lift apparatuses and of the safety device forming the object of this invention is described below.

Figure 1:
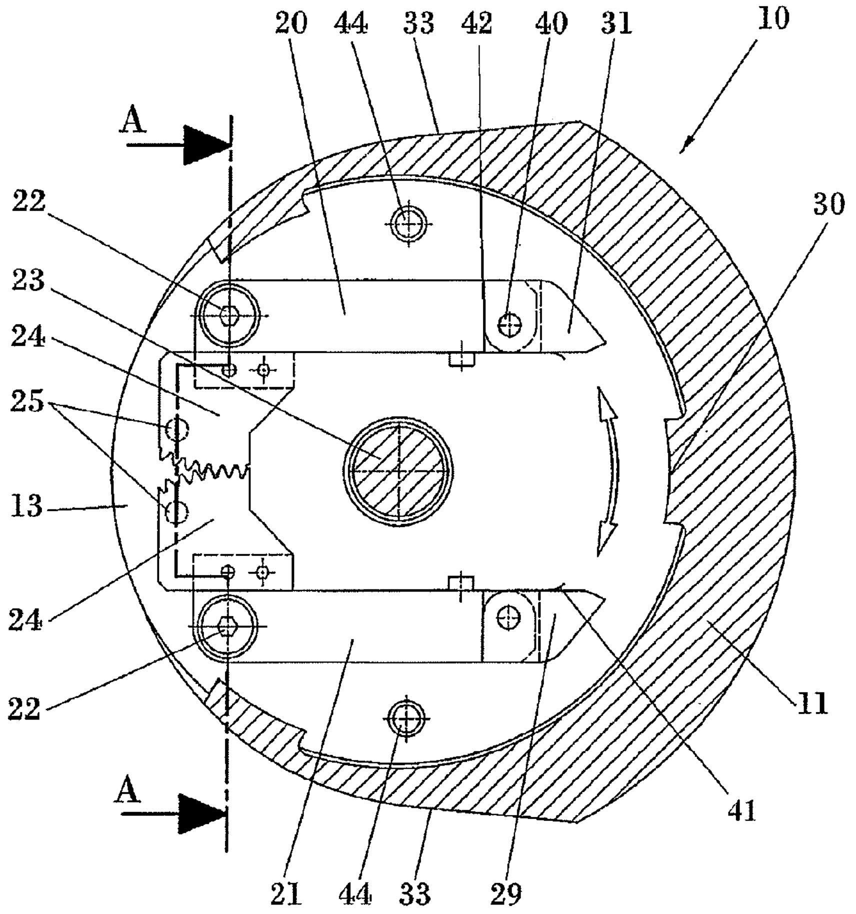
FIG. 1 shows an elevational view of the overspeed detection mechanism.

FIG. 1 shows a detailed view of the overspeed detection mechanism (10) comprising two pivoting arms (20, 21) linking on a wheel (13) by means of their axes of rotation (22) fixed to the wheel (13) and arranged symmetrically with regard to the axis of rotation (23) of the wheel (13). The opening of the pivoting arms (20, 21) is limited by stops (44). These pivoting arms (20, 21) tend to rotate in a synchronized manner through corresponding synchronization means (24), which can consist of toothed parts (24), as shown in FIG. 1, with regard to the axes of rotation (22) due to the centrifugal force they experience when the wheel (13) rotates.

The wheel (13) obtains its angular movement by means of the contact with a guide rail (2) on which the car (3) of the lift apparatus travels. Associated to the pivoting arms (20, 21) there are magnetic means (25, 26, 25', 26', 35) maintaining the position of the pivoting arms (20, 21) for a normal speed of the elevator car (3).

It can also be observed that the free ends (29, 31) of the pivoting arms (20, 21) are linked with regard to an axis of rotation (40) allowing rotation in one direction but preventing rotation in the opposite direction by means of stops (42). The free ends (29, 31) are kept in their position extended through flexible means, such as a flexible plate (41).

A drum (11) surrounding the wheel (13) which is assembled on its axis of rotation (23) and having a flat area on its outer face in which braking elements (33) are located, which elements can be shoes or brake pads for example, can also be seen in FIG. 1.

Figure 2:
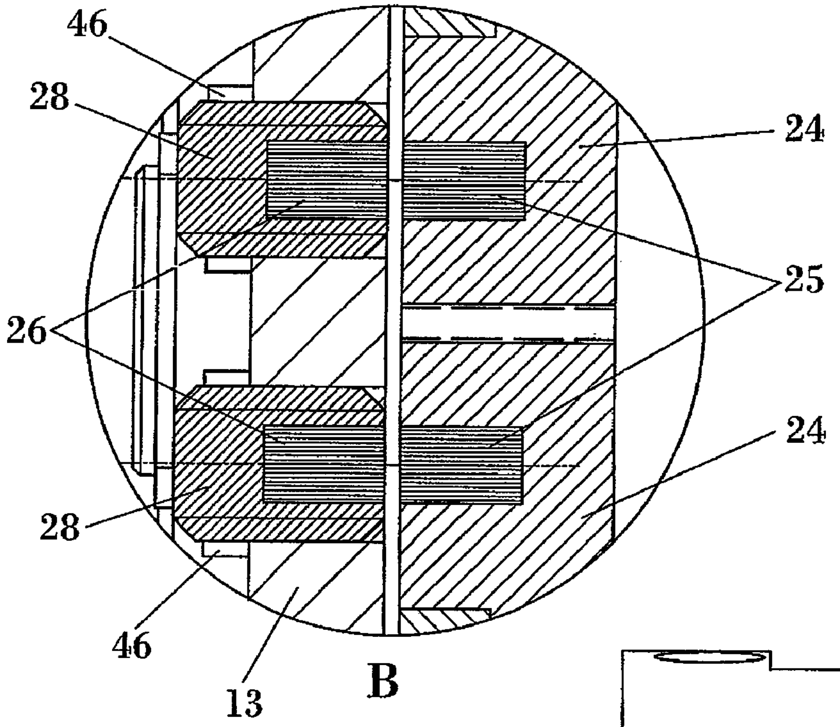
FIG. 2 shows a sectional view of the previous figure according to A-A and a detail according to B.
Figure 2:
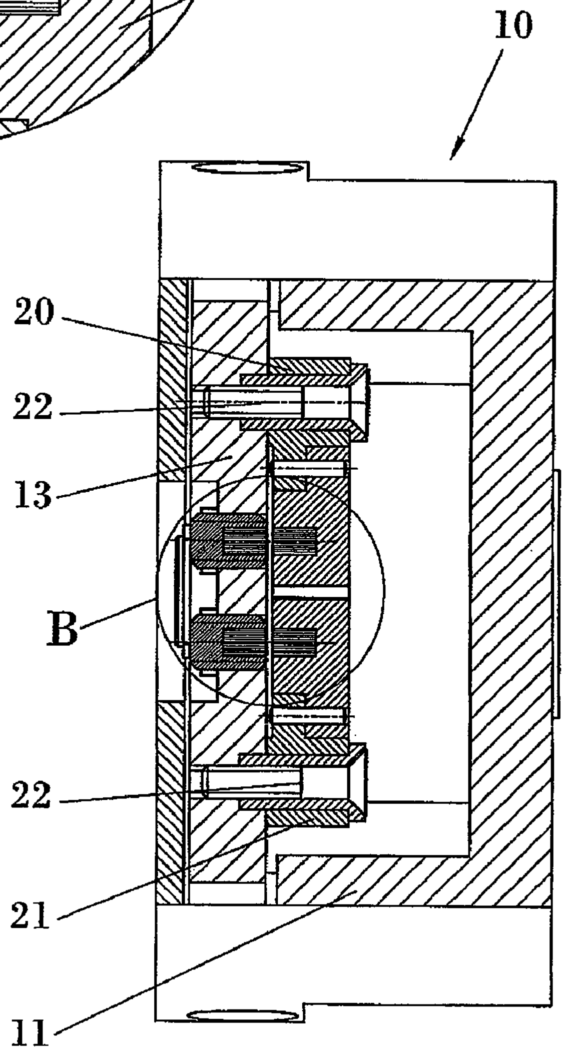

FIG. 2 shows the magnetic means consisting of a first pair of permanent magnets (25) associated to the pivoting arms (20, 21), more specifically it can be seen that they are inserted in the body of the toothed parts (24) linked to the pivoting arms (20, 21), which remain coaxially opposite to a second pair of magnets (26) located in the wheel (13) in the situation in which the car (3) is stopped. When the car (3) begins to travel, the wheel (13) begins to rotate, the magnets (25, 26) being opposite to one another through the attractive force, the position of the pivoting arms (20, 21) being maintained provided that the slew speed is not exceeded. The slew speed is established depending on the axial distance between each pair of permanent magnets (25), (26), which distance can be varied through regulating means (28, 46) associated to the second pair of magnets (26), such as a screw (28) and a counterscrew (46) assembled on the wheel (13).

Figure 3A:
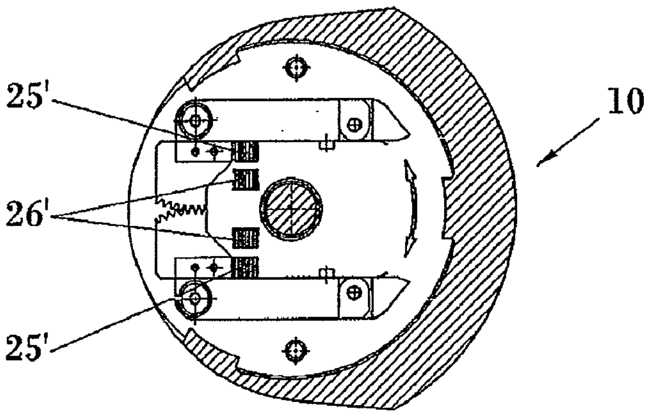
FIG. 3*a* shows a design alternative for the overspeed detection device in a possible embodiment in which the magnets of the pivoting arms are opposite to one another.
Figure 3B:
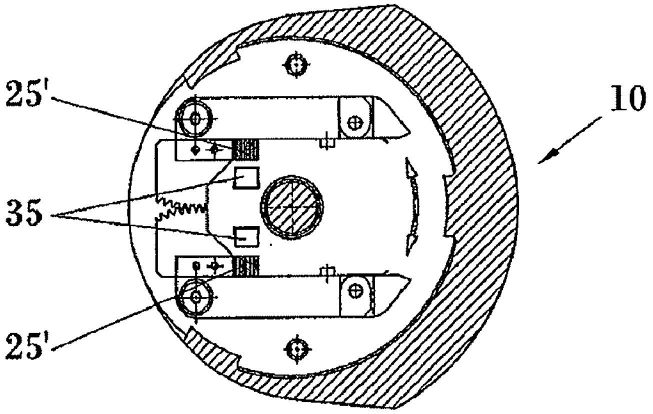
FIG. 3*b* shows another design alternative to the previous one in which one of the magnets is replaced with a ferromagnetic material.

FIG. 3*a* shows another embodiment of the invention in which a pair of magnets (25') is arranged in the inner face of the pivoting arms (20, 21), opposite to a second pair of magnets (26') linked to the wheel (13), which allow that the activation of the detection mechanism occurs more quickly than in the previous design. FIG. 3*b* shows another design alternative consisting of replacing the magnets (26') represented in the previous figure with ferromagnetic material (35), which does not change the operating mechanism.

Figure 4:
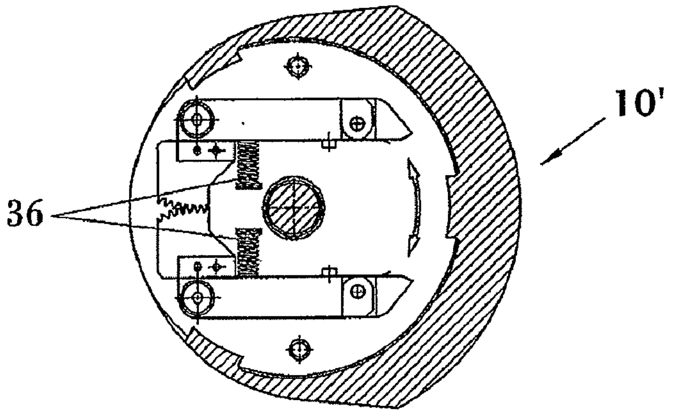
FIG. 4 shows a design alternative for the overspeed detection mechanism in which the slew speed is regulated by means of springs.

FIG. 4 shows another embodiment of the invention representing another centrifugal-type overspeed detection mechanism (10') which maintains the same structure as the previously described mechanism, but unlike the previous mechanism the slew speed is regulated by elastic means (36) instead of magnetic means (25, 26, 25', 26'), preferably a spring (36).

Figure 5A:
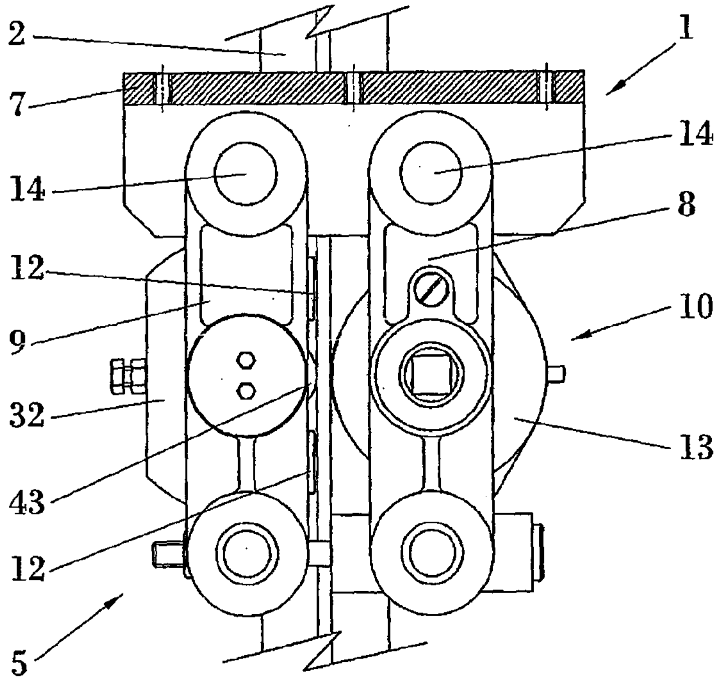
FIG. 5*a* shows a view of the safety device in its compact solution formed by the overspeed detection mechanism and the braking mechanism associated to a guide rail on which the elevator car travels.

FIG. 5*a* shows an external view of the safety device (1), which is fixed to the car (3) (not represented) by means of a rack (7), on which two swinging arms (8, 9) pivot with regard to hinge pins (14). An overspeed detection mechanism (10, 10') is assembled on the first swinging arm (8), whereas the second swinging arm (9) supports a braking mechanism (5) consisting of a casing (32) provided with braking means (12) and an auxiliary wheel (43) in contact with the guide rail (2). In the rest position, contact between the auxiliary wheel (43) and the guide rail (2) is assured by means of a pre-tensioning device (18, 19), as shown in FIG. 5*b*, comprising a spring (18) and a pre-tensioning screw (19).

Figure 5B:
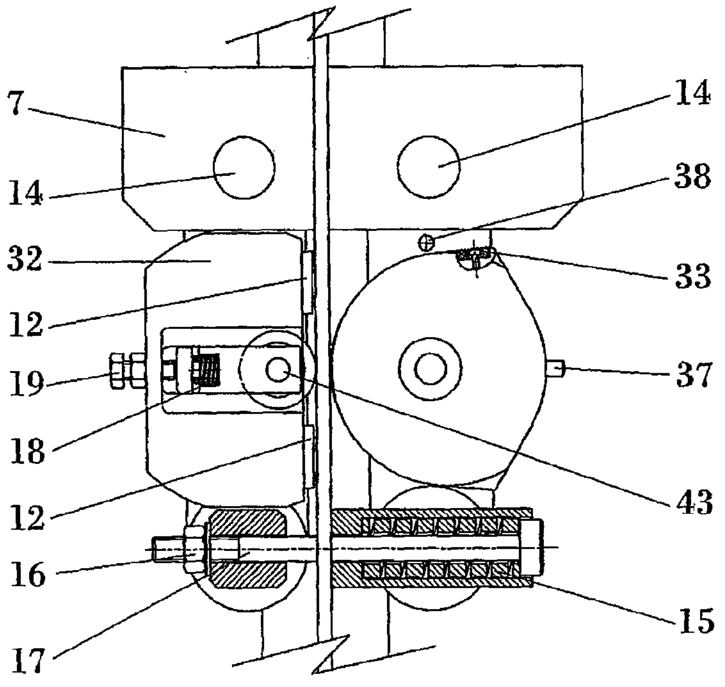
FIG. 5*b* shows an elevational view of the safety device of the previous figure in which the swinging arms have not been represented in order to observe the rest of the elements forming both mechanisms.

It is provided that the swinging arms (8, 9) are associated by their end opposite to their hinge pins (14), as observed in FIG. 5*b*, through joining means (15, 16, 17) which can consist of a spring (15), to which pre-tensioning means (16, 17), such as a screw (17) and nut (16), are associated. This spring (15) is usually in the rest position. In the moment of the actuation of the speed detection mechanism (10, 10'), the first swinging arm (8) swings, compressing the spring (15) and transmitting the swinging movement to the second swinging arm (9), establishing the activation of the braking mechanism (5), stopping the car (3).

The drum (11) is provided on its outer face with a projection (37) coming into contact against a flange (38) located on the first swinging arm (8) after the rotation of the drum (11) in the braking position of the braking element (33) on the guide rail (2), preventing the subsequent rotation of the drum (11), which flange (38) can incorporate switches to cut off the current feed to the elevator machine.

Figure 6A:
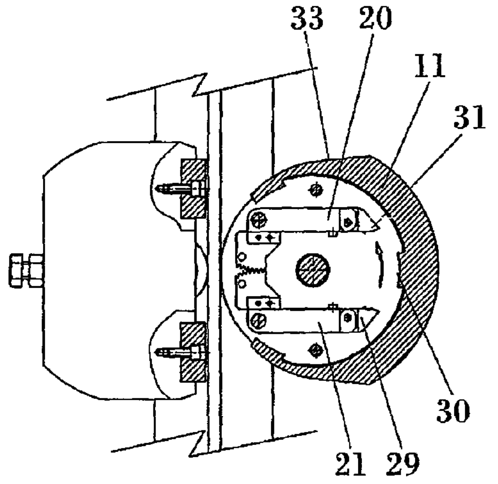
FIG. 6*a* shows a sectional diagrammatic view of the safety device in position at rest in which only the overspeed detection mechanism and the braking mechanism have been represented.

FIG. 6*a* shows a sectional view of the safety device in the rest position which corresponds with the stopped car (3). Once the car (3) begins to travel in the upward direction, the free ends (29, 31) of the pivoting arms (20, 21) begin to travel outwardly due to the centrifugal force they experience.

Figure 6B:
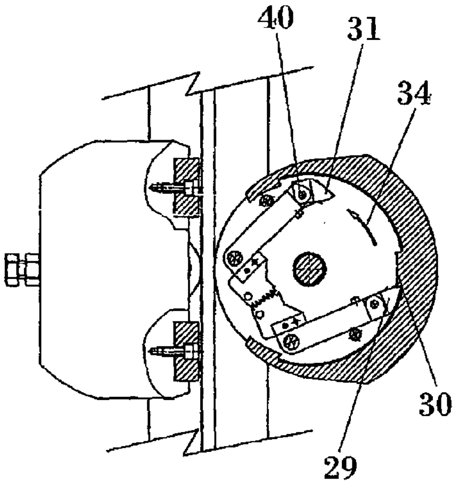
FIG. 6*b* shows a sectional view of the safety device represented in FIG. 6*a* in the moment in which the slew speed is exceeded and the movement of the wheel is integral with that of the drum in the overspeed detection mechanism.
Figure 6C:
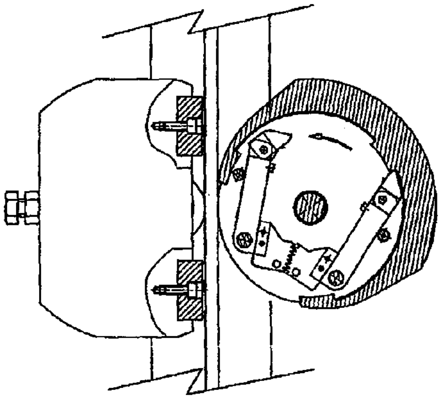
FIG. 6*c* shows a sectional view of the safety device represented in the previous figure in the moment in which the drum comes into contact with the guide rail.
Figure 6D:
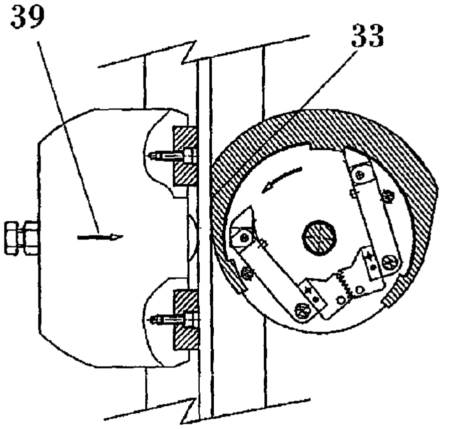
FIG. 6*d* shows a sectional view of the safety device represented in the previous figure in the moment in which the braking elements of the overspeed detection mechanism and the braking means of the braking mechanism act on the guide rail, stopping the movement of the car of the lift apparatus.

FIG. 6*b* shows the moment in which the slew speed is reached when the car (3) travels in an upward direction; the centrifugal force then equals and begins to overcome the attractive magnetic force between each pair of permanent magnets (25), (26), such that the pivoting arms (20, 21) tend to abruptly rotate outwardly from the wheel (13) until one of the free ends (29) of one of the pivoting arms (20, 21) collides with a stop (30) integral with the drum (11), transferring its kinetic energy to it, causing both parts, wheel (13) and drum (11), to integrally rotate at the same speed until reaching the position shown in FIG. 6*c*, in which the braking element (33) of the drum (11) begins its contact with the guide rail (2) until reaching its final braking position, as shown in FIG. 6*d*. When the braking element (33) comes into contact with the guide rail (2), it makes the drum (11) rotate and the wheel (13) separate from the guide rail (2), forcing the spring (15) to be compressed, relatively moving the braking elements (12) of the braking mechanism (5) towards the guide rail (2), as represented by the arrow (39), providing the braking force that stops the car (3). While this sequence occurs, the other free end (31) of the other pivoting arm (20) has been retracted, rotating about an axis (40), assuring that only one of the pivoting arms (21) acts.

Figure 7:
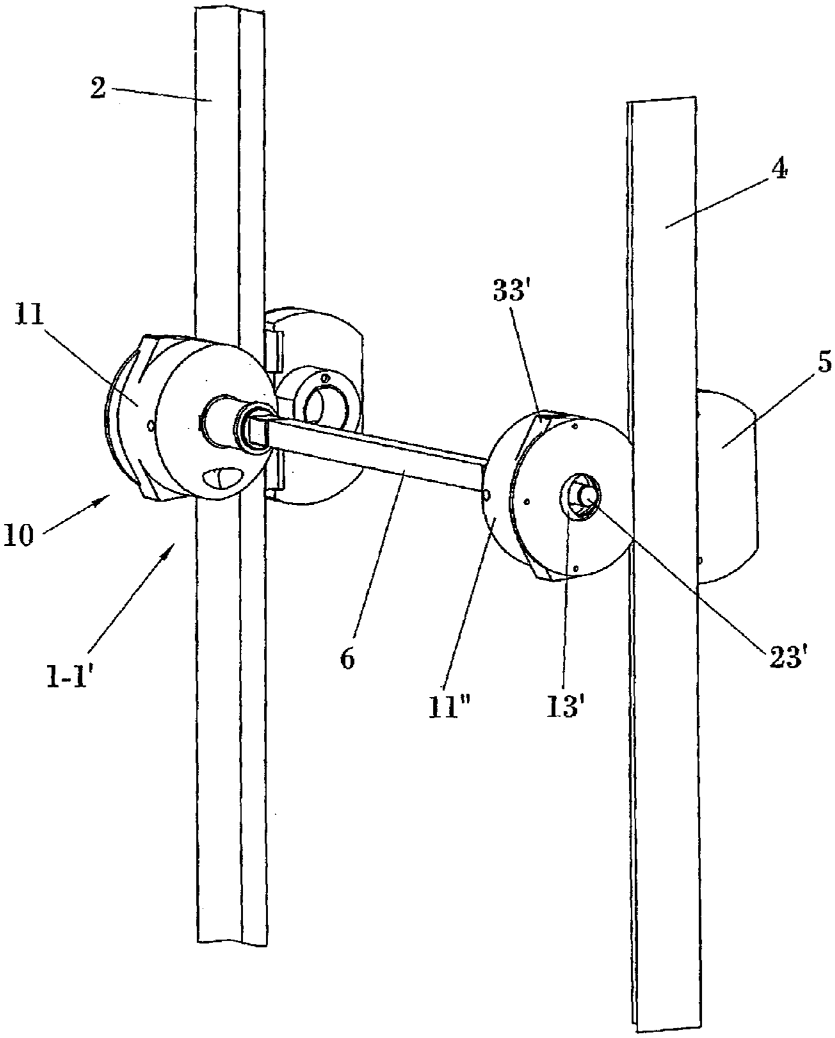
FIG. 7 shows a partial view corresponding to the elevator car in the event that it incorporates a safety device associated to a guide rail and a braking mechanism associated to other guide rail, both linked by means of a synchronization bar.

FIG. 7 shows a diagrammatic representation in which the elevator car (3) incorporates the safety device (1-1') associated to the first guide rail (2), an additionally incorporates a braking mechanism (5) linked to the car frame (3) of the lift apparatus and associated to a second guide rail (4), like said braking mechanism (5) is connected to with the axis (23') of a wheel (13') which rotates in contact with the second guide rail (4), externally to which second drum (11") is located, provided with braking elements (33') on its outer face, which second drum (11") is linked by means of a synchronization bar (6) to the drum (11) of the detection mechanism (10) of the safety device (1-1'), establishing the synchronized activation of the second drum (11") and braking mechanism (5) on the second guide rail (4) when the activation of the safety device (1-1') occurs.

Figure 8:
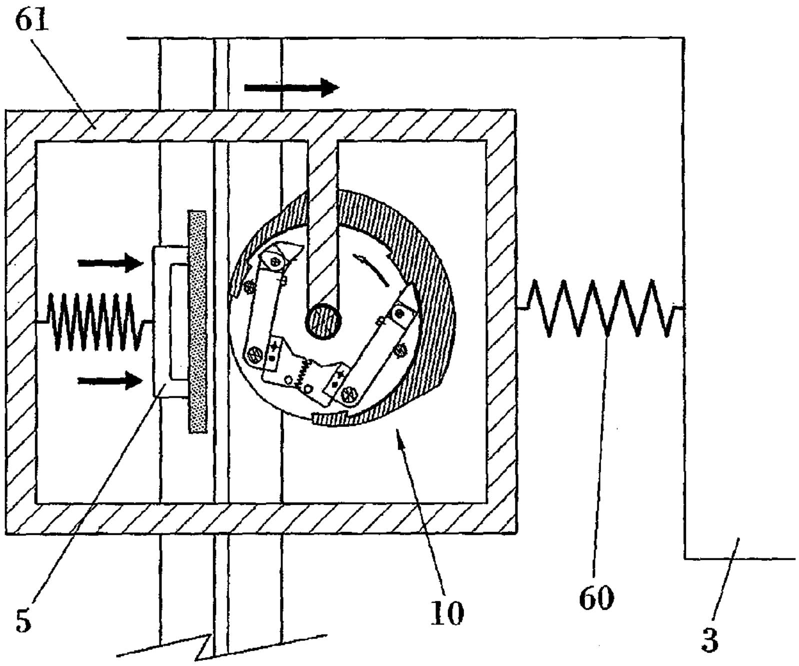
FIG. 8 shows a diagrammatic view of a safety device connecting an overspeed detection mechanism with a braking mechanism directly with the intervention of a support.

FIG. 8 shows an alternative solution in which the overspeed detection mechanism (10, 10') is linked to the braking mechanism (5) with the intervention of a support (61), and the contact pressure means (60, 18, 19) consist of a spring (60) located between the car (3) and the support (61) maintaining the wheel (13) of the overspeed detection mechanism (10, 10') against the guide rail (2).

Figure 9:
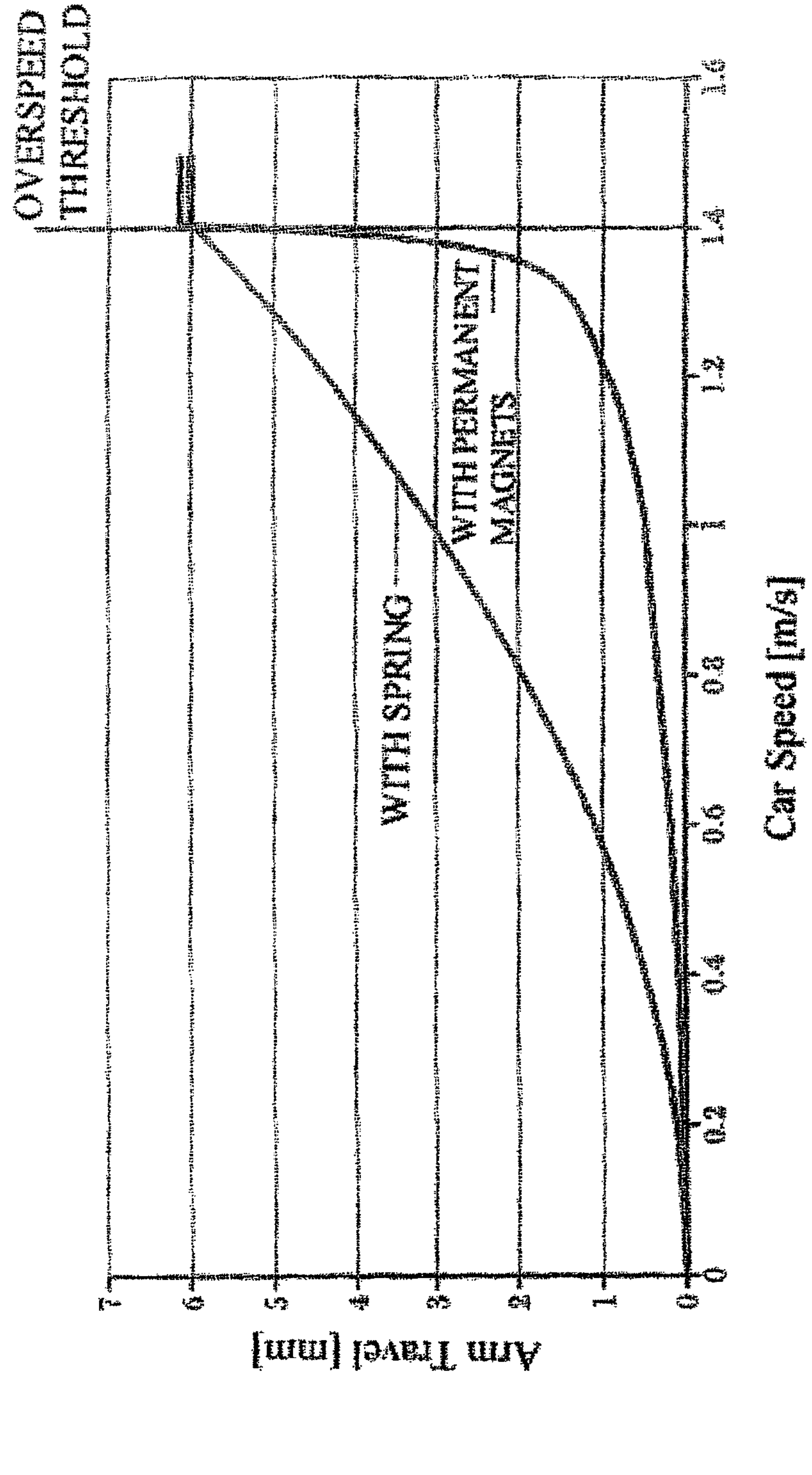
FIG. 9 shows a graph in which the activation curves of the overspeed detection mechanism has been represented for the case in which it incorporates magnetic means (permanent magnets) and for the case in which it incorporates elastic means (spring).

FIG. 9 shows the curves corresponding to the traveling of the free ends (29, 31) of the pivoting arms (20, 21) according to the present invention and the curve corresponding to the use of springs (36) instead of permanent magnets, depending on the traveling speed of the car (3). It is clearly observed that once the slew speed is approached, the traveling of the end of the pivoting arm (20, 21) in the case of using permanent magnets (25, 26, 25', 26') occurs in a much quicker manner than in the case of using springs (36).

Figure 10:
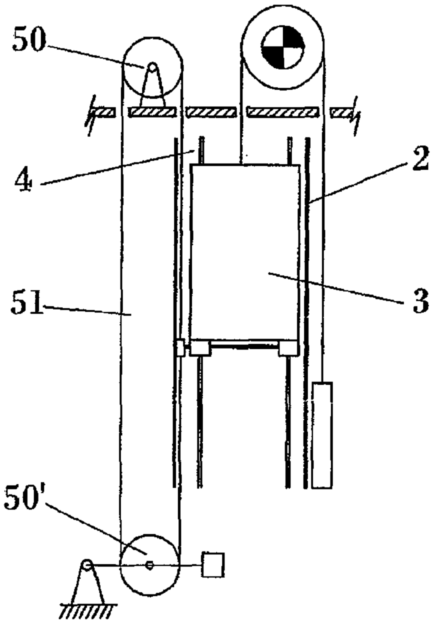
FIG. 10 shows a representation of the diagram of the lift apparatus which shows the sheaves on which the overspeed detection mechanism can be assembled.

FIG. 10 shows the assembly of the lift apparatus, traveling on guide rails (2, 4), having an upper sheave (50) and a lower sheave (50') on which the rope of the speed governor (51) associated to the elevator car (3) rotates.

Figure 11:
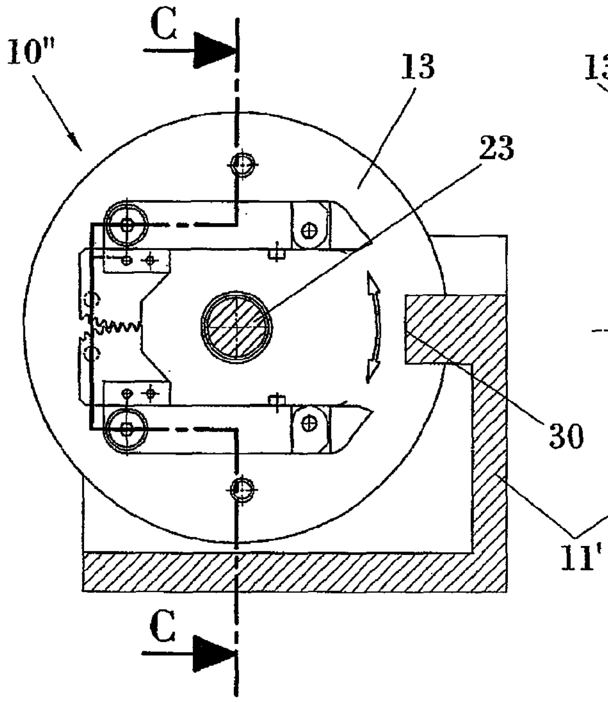
FIG. 11 shows the overspeed detection mechanism in its application for one of the sheaves.
Figure 12:
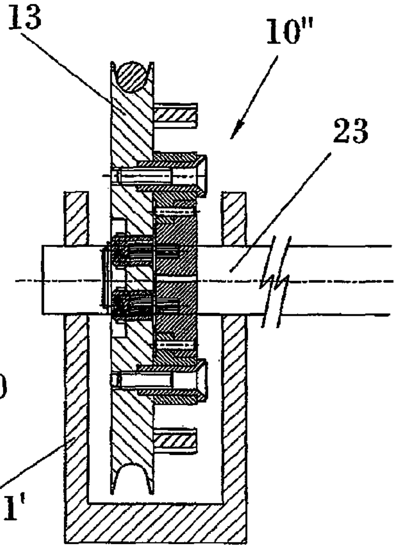
FIG. 12 shows a sectional view according to C-C of the previous figure.

The previously described overspeed detection mechanism (10") can be incorporated on said sheaves (50, 50'), as shown in FIGS. 11 and 12, in which the wheel (13), with its axis (23), is assembled in the same axis of the sheave (50, 50') and the part (11-11') external to the wheel (13), instead of being a drum (11), is a fixed part (11') provided with the stop (30) against which one of the pivoting arms (20, 21) comes into contact in case of overspeed, braking the wheel (13), stopping the sheave (50, 50') and therefore the elevator car (3).

The invention claimed is:

1. An overspeed detection mechanism for a lift apparatus that includes a wheel, provided with an axis rotating according to a traveling speed of a car of the lift apparatus, the overspeed detection mechanism comprising;

at least one pivoting arm, of at least two pivoting arms assembled on a flat face of the wheel, provided with a linkage in one of its ends and with a free end at its opposite end, swinging through an action of a centrifugal force caused by the rotation of the wheel, magnetic means generating an attractive force maintaining the position of the pivoting arm on the wheel for a traveling speed of the car, a stop, belonging to a part external to the wheel, slightly extending towards the inside thereof, against which the free end of the pivoting arm comes into contact when the centrifugal force generated on the pivoting arm through the rotation of the wheel, due to overspeed of the car, exceeds the attractive force of the magnetic means, starting the braking of the car, wherein the magnetic means includes magnets associated to each of the pivoting arms opposite to magnets located on the wheel for detection of speed of the wheel above an overspeed threshold, and includes a regulating means to regulate a distance between opposing magnets, regulating the attractive force between said opposing magnets, and wherein the wheel rotates in contact with a guide rail, and the part external to the wheel includes a drum provided with the stop which is assembled around the axis of the rotating wheel with which the drum rotates integrally when the pivoting arm comes into contact with the stop due to overspeed, and which drum is provided on its outer face with at least one braking element progressively acting against the guide rail while the drum rotates until only the braking element comes into contact with the guide rail, whereby the wheel no longer makes contact with the guide rail and the axis travels in a direction away from the guide rail.

2. An overspeed detection mechanism according to claim 1, wherein the pivoting arms swing, connected by a synchronization device.

3. An overspeed detection mechanism according to claim 2, wherein the synchronization device includes toothed parts.

4. An overspeed detection mechanism according to claim 1, wherein at least one of the magnets includes a ferromagnetic material.

5. An overspeed detection mechanism according to claim 1, wherein free ends of the pivoting arms are linked to facilitate their retraction and are in permanent contact with elastic means facilitating recovery of an extended position of the free ends.

6. An overspeed detection mechanism according to claim 1, wherein the wheel incorporates on the face on which the pivoting arms are located fixed stops against which the pivoting arms can come into contact so as to establish their maximum opening position reached under the effect of the centrifugal force.

7. An overspeed detection mechanism according to claim 1, wherein the drum includes braking elements with different profiles, each of them generating a different braking force for different rotating directions of the wheel and therefore for the upward or downward movement of the car.

* * * * *